8092X
A. COFFMAN.
EARTHEN TUBE MACHINE.
Patented Mar. 18, 1834.
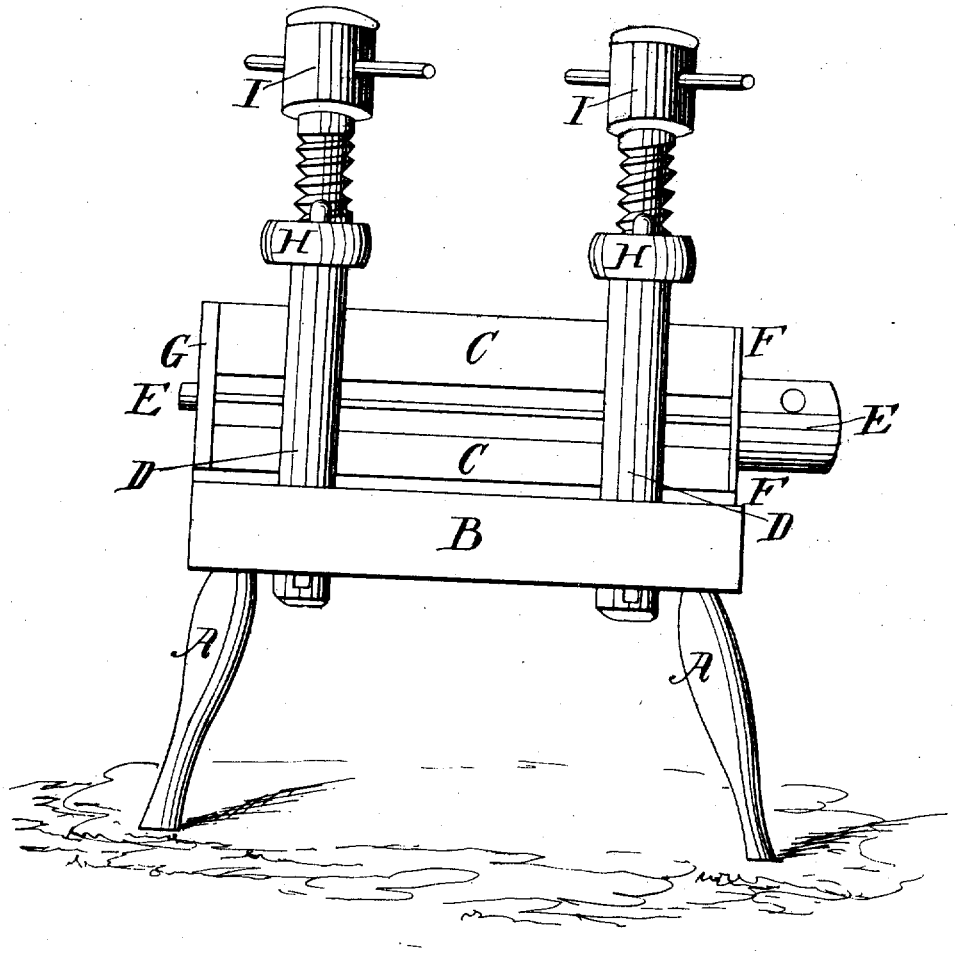
THE NORRIS PETERS CO., PHOTO-LITHO., WASHINGTON, D. C.

Andrew Coffman of New Market Virginia
Letters Patent

The Schedule referred to in these Letters Patent and making part of the same containing a description in the words of the said Andrew Coffman himself of his improvement in the machine for making stone or earthen pipes for the conveyance of water &c To all to whom these presents shall come: Be it known that I Andrew Coffman of New Market in the County of Shenandoah & State of Virginia have invented a new method of making clay or stone tubes or pipes for the conveyance of water &c by means of a press and mould and that the following is a full and exact description of the construction and operation of the same. The press consists of a bench of thick Plank 3½ feet long and 17 or 18 inches wide, supported on four posts or legs of any convenient height. About 9 inches from each end are two mortices in which are framed two uprights the tenons to extend through the bench to admit being secured by keys or pins. Said uprights to be about 6 inches wide 2½ thick & extend above the bench about twelve inches to a cross piece through which is a 2½ inch wooden screw worked by a lever at the upper end of said screw. The mould consists of two oblong blocks about 3 feet long. 6 inches wide & 5 thick. one side is worked to a semi cylindric hollow of about 3 inches diameter to within 2 inches of one end where the diameter is half an inch less. which moulds a round tenon on the end of the tube. the corners of the hollow blocks are champered to an angle of 45° making the edge between the angle & hollow nearly sharp (to admit the superfluous clay being pressed out) on each side of the hollow blocks about 6 inches from each end are Iron dowels with corresponding holes in the other Block to receive the end of said pins to keep the hollow blocks to their proper place so as to form a perfect cylindric hollow to be covered with sheet copper or other suitable metal. on each end of said blocks are bearings to support the ends of a staff turned of metal or some fine grained wood. such as cedar apple cherry &c said Staff is three feet feet eight inches long one end extends beyond the ends of the hollow blocks.
and is about 4 inches in diameter. the head terminates by a square shoul-
der towards the longest end of the staff joining the head. the diameter
is 2 1/2 inches & 2 inches long to form a socket to receive the other end
of the tube then another offset reduces it to 1 3/4. inch at the largest
end. the other end is about 1/8 less tapering from the said offset in a
straight line — Operation. After the clay is properly tempered and
cut in sheets of 5 1/2 inches wide 36 inches long and 5/8ths thick.
take two sheets and lay them in the hollow block and lap join them in
the bottom of the hollow. then lay on the staff and join the two sheets
of clay on top. then put on the other hollow block. take it to the press
and force the two blocks together, and force out all the superfluous, loose
the screws, turn the staff and take it from the mould.
For further illustration of my invention I refer to the drawing and model
of the same deposited in the Patent office. What is here claimed as
my invention is the construction of the mould and the application of
the said pipes in the manner above specified for the conveyance of
water by stone or earthen pipes. In Witness that the above is a
true Specification. I have hereunto subscribed my name at the town
of New Market Shenandoah County and State of Virginia this
1st day of March 1834.

Exd. Witnesses Andrew Coffman
W.H.C. Samuel G. Henkel Drawing
James McCann